June 13, 1933.                H. BROSCOMBE                 1,913,915
              PORTABLE WEIGHING MACHINE FOR LOCOMOTIVES
                       AND OTHER RAIL VEHICLES
                         Filed Aug. 25, 1931
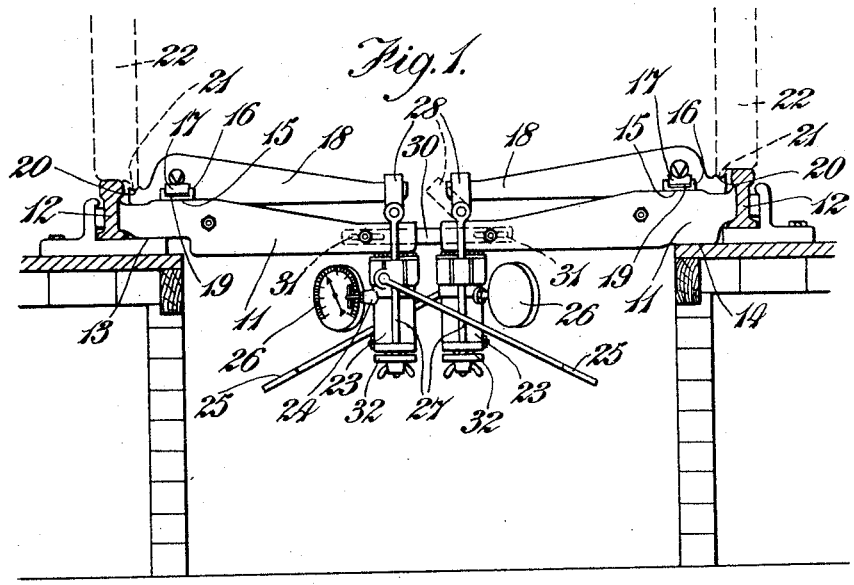
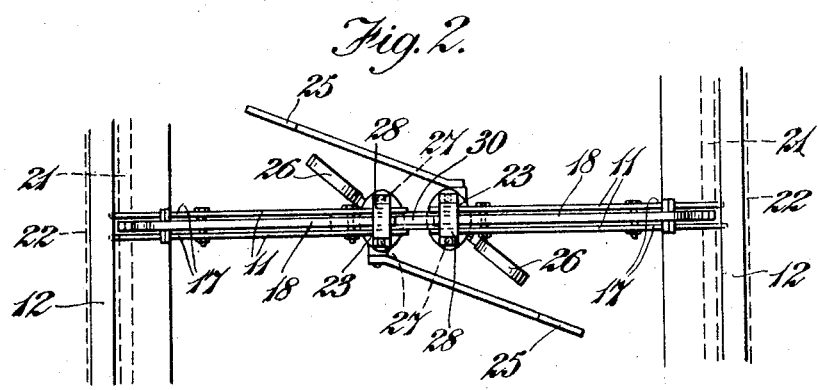
INVENTOR
Henry Broscombe.
By Lacey & Lacey,
Attys

UNITED STATES PATENT OFFICE

HENRY BROSCOMBE, OF HALTON, LEEDS, ENGLAND, ASSIGNOR OF ONE-HALF TO ALBERT FIELDHOUSE KELLETT, OF LEEDS, ENGLAND

PORTABLE WEIGHING MACHINE FOR LOCOMOTIVES AND OTHER RAIL VEHICLES

Application filed August 25, 1931, Serial No. 559,261, and in Great Britain October 20, 1930.

This invention relates to portable weighing machines for locomotives and other rail vehicles for the purpose of ascertaining the load which each vehicle spring is carrying.

Portable weighing machines for this purpose as hitherto proposed have comprised a balance arm pivotally mounted upon a frame adapted to engage and be clamped to the running rail so as to lie outside the rail track and rest at its outer end upon an adjustable foot engaging the ballast or ground, the inner end of said balance arm being formed with an apex or pointed bearing to engage the tread of a vehicle wheel and raise the latter from the rail when the other end of said balance arm is depressed by the action of a pump disposed above the latter an connected by links to the outer end of the frame. The pump has had associated therewith an indicator for giving readings of the weights raised, and the bearing for the fulcrum of the balance arm has been vertically adjustable on the frame so as to render the machine applicable to rails of different heights.

With this kind of weighing machine the apex or pointed bearing for engaging the wheel tread can only engage and lift the wheel when the flange of the latter is close up to the running rail so as to provide a sufficient overhang of the wheel tread beyond the outside of the rail. By reason of the amount of play necessary between the rails and the adjacent faces of the wheel flanges to enable a vehicle to negotiate curves, the desirable state of sufficient wheel tread overhang when a vehicle comes to rest on a straight rail track, such as in an engine shed, is seldom realized at both sides and it is necessary to "push over" the locomotive or vehicle to one side or the other to enable weighings to be obtained with machines as above described. Moreover, it is found in practice that, by reason of the clamping of the weighing machine frame through the medium of a hook or hooks engaging around the underside of the rail, the action of the pump in depressing the outer end of the balance arm causes the foot upon which the outer end of the frame rests to dig into the ballast or ground.

The present invention has for an object to provide a new or improved weighing machine of the balance arm type whereby the difficulties above set forth will be overcome.

According to the present invention, the frame of a weighing machine of the balance arm type is adapted to engage the inside of the running rail and to overhang the pit between the running rails, while one end of the balance arm of the machine is adapted to engage the flange of the vehicle wheel to raise the latter when the other end of said balance arm is acted upon by means of a pump.

The machine frame may rest near that end at which it engages the running rail directly upon the sill of the pit or upon a metal plate thereon, while the corresponding end of the balance arm carries a V-shaped bearing for engagement with the flange of a wheel immediately below the centre of the latter, the other end of said balance arm being formed for engagement with the plunger of the pump. Preferably also, the fulcrum bearing for the balance arm is adjustable in position horizontally as well as vertically so that the V-shaped bearing adapted to co-operate with the flange of a wheel can be correctly engaged with such flange either when it is close to or spaced somewhat from the rail and whatever its height within limits.

Preferably, the pump is so arranged as to extend downwardly within the pit from that end of the machine frame remote from the running rail, and the plunger thereof is adapted to be linked, as by a stirrup, to the corresponding end of the balance arm.

If desired, the end of the machine frame which engages the inside of the rail may be toothed, serrated or otherwise formed to afford a good grip when the machine is in use. In some cases two machine frames with their associated balance arms and pumps may be linked together end to end so that their outer ends engage the running rail at opposite sides of the pit.

The invention is illustrated by the accompanying drawing, Figures 1 and 2 of which show one form of locomotive weighing machine according to the invention in elevation and in plan respectively.

The weighing machine illustrated comprises actually two units or machines each of which is similar to the other and, as will be explained hereinafter, either of these units can be used by itself, although in general it will be more convenient to employ two in the manner illustrated.

Each unit or machine comprises a frame built up from two steel plates 11, 11 which are bolted together in spaced relationship and shaped at their outer ends to engage with the side of a rail 12 and to bear near their outer ends either upon a chair, as indicated at 13, or upon the side of the pit, as indicated at 14. It should be noted, however, that the engagement of the machine frames comprised by the plates 11 with the rails 12, whether the latter be of the bull head or flat bottom type, will be such that during weighing said frames will be supported by said rails quite independently of the sill of the pit. Each machine frame 11 presents at the top thereof near its outer end a flat seat 15 upon which rests a bearer block 16, which may be moved inwardly and outwardly thereon. This bearer block 16 carries a fulcrum-bearing member 17 for a corresponding balance arm 18 and may be adjusted in height by means of shims, such as that indicated at 19, placed between it and the corresponding bearer block 16. Thus, a V-shaped seat 20 at the outer end of the balance arm 18 may be adjusted in position to engage correctly with the flange, indicated at 21, of a wheel, indicated at 22, whatever be the height of said flange 21 and its distance from the rail 12.

For each unit or machine there is provided a pump 23 of known type having a release valve 24, an operating lever 25 and pressure gauge 26. The plunger of this pump is adapted to be connected with the balance arm 18 by means of a plate 32 and links 27 and a stirrup 28 pivotally connected with said links 27. The inner end of the corresponding balance arm 18 is formed as shown to engage the stirrup member 28. The pump may, if desired, be secured to the inner end of the corresponding machine frame 11, or, alternatively it may be suspended solely from the corresponding balance arm in which position it is supported by the links 27 and the stirrup member 28.

In the case illustrated, the inner ends of the two machine frames 11 are linked together by stays 30. Preferably, the connection of these stays with the frames 11 is such, as by means of slots indicated at 31, as to permit the pair of machines frames to be engaged with running rails set to gauges which vary within limits. In some cases, although not so shown, it may be desirable that the means linking the inner ends of the machine frames 11 should be capable of forcing the machine frames apart from one another into firm engagement at their outer ends with the running rails.

It will be seen that each unit or machine is of a very simple nature indeed, comprising three main parts, namely, a pump, of which the pressure gauge may be calibrated to read "weights" directly, the frame of the machine, the balance arm and the bearer block and fulcrum bearing. Moreover, by the present invention there is provided a weighing machine of the balance arm type, whereby all the operations of weighing can be carried out within the wheel gauge and beneath a vehicle without any necessity of clamping the weighing machine to a rail, and without having to move the vehicle laterally of the rails to enable the machine to be engaged with the wheels thereof.

What I claim is :—

1. A portable weighing machine for rail vehicles including a frame adapted to engage the inner side of a track rail and overhang a pit between track rails, a balance arm fulcrumed on the frame with one end arranged to engage the flange of the wheel on the rail, a pump connected with the opposite end of the arm to act thereon, and a fluid pressure indicator connected with the pump.

2. A portable weighing machine for rail vehicles including a frame constructed to engage the inner side of a track rail and overhang a pit between the rails and rest upon the sill of the pit adjacent the rail, a balance arm fulcrumed on the frame and provided at one end with a V-shaped bearing to engage the flange of a wheel on the rail, a pump having its plunger engaged with the opposite end of the arm, and a fluid pressure indicator connected with the pump.

3. A portable weighing machine for rail vehicles including a frame constructed to engage the inner side of a track rail and overhang a pit between track rails, a vertically and horizontally adjustable bearing on the frame, a balance arm fulcrumed on said bearing and provided at its outer end with a V-shaped bearing to engage the flange of a wheel on the rail, a pump connected with the inner end of the arm to act thereon, and a fluid pressure indicator connected with the pump.

4. A portable weighing machine for rail vehicles including a frame adapted to engage the inner side of a track rail and overhang a pit between track rails, a balance arm fulcrumed on the frame with one end arranged to engage the flange of a wheel on the rail, a pump having its plunger suspended on the inner end of the arm, and a fluid pressure indicator connected with the pump.

5. A portable weighing machine for rail vehicles including a frame adapted to engage the inner side of a track rail and overhang a pit between track rails, a balance arm fulcrumed on the frame with one end arranged to engage the flange of a wheel on the rail, a pump, links connected at their lower ends with the plunger of the pump, a stirrup connecting the upper ends of the links and passing over the inner end of the arm, and a fluid pressure indicator connected with the pump.

6. A weighing machine for rail vehicles including frames constructed to engage the inner sides of track rails and overhang a pit between the rails, balance arms fulcrumed on the frames and having their outer ends arranged to engage flanges of wheels on the rails, pumps suspended from and acting on the inner ends of the arms, fluid pressure indicators connected with the pumps, and a link connecting the inner ends of the frames.

HENRY BROSCOMBE.